Patented Oct. 14, 1941

2,259,169

UNITED STATES PATENT OFFICE 2,259,169

RESINOUS MATERIAL

Julian R. Little, Packanack Lake, N. J., assignor to United States Rubber Company, New York, N. Y., a corporation of New Jersey No Drawing. Application October 29, 1938, Serial No. 237,744

9 Claims. (Cl. 23—1)

This invention relates to a new and useful resinous material.

According to the present invention such a material may be prepared by the interaction of an acid salt of any polyalkylene-polyamine, an aldehyde including polymeric forms, and any ketone having reactive hydrogen atoms attached to carbon atoms which are alpha to the carbonyl group. By polyalkylene-polyamines are meant those bodies containing two or more alkylene groups in which the alkalene group contains two or more carbon atoms, e. g. diethylenetriamine, triethylenetetramine, and the higher polymers formed by the reaction of ethylene dihalides with ammonia, particularly where at least three reactive nitrogen atoms are present. Mixtures of such bodies may also be used. Among such aldehydes are formaldehyde, paraformaldehyde, acetaldehyde, etc. Among such ketones are acetone, cyclohexanone, acetonylacetone, etc. The reagents may be mixed together in any order, the reaction being carried to the stage of resinification evidenced by gelation.

It has further been found that such resinous materials or their salts, e. g. the hydrochloride, have anion-exchange properties, namely, being capable of sorbing anions from solutions or from gases, making them suitable for removing desirable or undesirable anions from water solutions, for separating anions in solution by selectively adsorbing certain anions, and for adsorbing certain gases from mixtures of gases, etc.

The polyalklene-polyamines may be made in known manner by reacting an alkylene halide with either anhydrous or aqueous ammonia, preferably under pressure, and liberating the amines formed, by the addition of caustic.

The following examples are given to illustrate the invention, the parts being by weight:

*Example I.*—The amine hydrochloride formed by treating 14 parts of diethylene triamine (74%) with 30 parts of hydrochloric acid (sp. gr. 1.19) is heated under reflux for one hour with a mixture of 38 parts of formaldehyde (40%) and 145 parts of acetone. The gel formed is treated with a solution of caustic to liberate the free base. The gel is washed with water until neutral to thymol blue and then dried in an oven at 80° C. The dried material consists of hard, tough pellets, having a brown to reddish-brown color. The resin swells but does not dissolve in water or alcohol, yielding a jelly-like material which crumbles readily.

*Example II.*—The amine hydrochloride formed by treating 50 parts of a mixture of polyethylene polyamines (resulting from reacting ammonia with ethylene dichloride and having a boiling range largely from 200–375° C.) (80%) with 80 parts of hydrochloric acid (sp. gr. 1.19) is heated under reflux for one hour with a mixture of 75 parts of formaldehyde (40%) and 290 parts of acetone. The gel which forms is treated with a solution of caustic to liberate the free base. The gel is washed with water until neutral to thymol blue and then dried in an oven at 80° C.

This resin is especially suited for anion exchange as shown below.

*Example III.*—A 0.1 N solution of hydrochloric acid was passed through a portion of the resin of Example II until the effluent is the same strength as the original hydrochloric acid solution. The resin took up 28 g. or 0.76 equivalent of hydrogen chloride per 100 g. of resin. The effluent is free from hydrochloric acid until 88% of total capacity of the resin has been used. The experiment when repeated using .005N hydrochloric acid shows that 22.6 g. or 0.62 equivalent of hydrogen chloride are taken up per 100 g. of resin. The effluent is free from hydrochloric acid until 84% of the capacity of the resin has been used.

Acetic acid is taken up almost as completely as hydrochloric acid. Experiments with carbon dioxide solutions show that the resin absorbs carbonate ion appreciably although the capacity is somewhat smaller than for anions of stronger acids.

The resin hydrochloride may be treated with strong alkalies to convert it into the free basic resin, and the latter may be then treated with an alkylating agent, such as an alkyl halide or sulfate to form at least partially quaternary ammonium compounds. For this purpose, an alkyl halide may be used, e. g. methyl chloride, methyl bromide, methyl iodide, dimethyl sulfate, ethyl chloride, ethyl bromide, ethyl iodide, diethyl sulphate, etc., followed by hydrolysis as by treatment with alkali of the resulting quaternary salts to yield quaternary ammonium hydroxides. The quaternary ammonium hydroxides, being of a very strongly basic nature, that is, having the same order of basicity as sodium hydroxide, are hence capable of taking up anions of weak acids even in the presence of excess sodium ions.

*Example IV.*—29 grams of resin prepared from polyethylene polyamine hydrochloride, formalin and acetone in a manner similar to that in Example II is washed with sodium hydroxide solution, then with water and dried at 60° C. The free resin base (8.5 g.) obtained is suspended in excess dimethyl sulfate and heated on a steam bath for four hours. After removal of the unused dimethyl sulfate, the resin weighs 12 g. The resin sulfate is washed with sodium hydroxide solution and then with water to obtain the free resin base.

Further examples of polyalkyleneamine polymers, other than the polyethylene materials given above, useful for the purposes of the invention are the corresponding butylene, and propylene, etc. bodies, resulting from the reaction of butylene or propylene dihalides, or other aliphatic di- and poly-halides, with ammonia.

It is intended that the patent shall cover by suitable expression in the claims, whatever features of patentable novelty reside in the invention.

Having thus described my invention, what I claim and desire to protect by Letters Patent is:

1. A water-insoluble resin, having anion-exchange properties, resulting from reacting a polyalkylene polyamine, an aldehyde, and a ketone.

2. A water-insoluble resin, having anion-exchange properties, resulting from the reaction of a polyalkylene polyamine having at least three reactive nitrogen atoms, an aldehyde, and a ketone having reactive hydrogen atoms attached to carbon atoms which are alpha to a carbonyl group.

3. A water-insoluble resin, having anion-exchange properties, resulting from the reaction of a polyethylene polyamine material, an aldehyde, and a ketone having reactive hydrogen atoms attached to carbon atoms which are alpha to a carbonyl group.

4. A water-insoluble resin, having anion-exchange properties, resulting from the reaction of a polyethylene polyamine material, formaldehyde, and a ketone having reactive hydrogen atoms attached to carbon atoms which are alpha to a carbonyl group.

5. A water-insoluble resin, having anion-exchange properties, resulting from the reaction of a polyethylene polyamine material, formaldehyde, and acetone.

6. A water-insoluble resin, having anion-exchange properties, resulting from reacting a polyalkylene polyamine with an aldehyde and a ketone whereby to form a basic resin, and alkylating the basic resin to at least partially form a resinous quaternary ammonium compound.

7. A process which comprises bringing a fluid into contact with a synthetic resin having anion-exchange properties, which resin results from reacting a polyalkylene polyamine, an aldehyde, and a ketone, whereby to selectively sorb from the fluid a desired constituent.

8. A process which comprises bringing a fluid into contact with a synthetic resin resulting from reacting a polyalkylene polyamine with an aldehyde and a ketone whereby to form a basic resin, and alkylating the basic resin to at least partially form a resinous quaternary ammonium compound, said resin being characterized as having anion-exchange properties, whereby to selectively sorb from the fluid a desired constituent.

9. A process which comprises bringing a fluid into contact with a synthetic resin having anion-exchange properties, which resin results from reacting a polyalkylene polyamine, an aldehyde, and a ketone, whereby to selectively sorb from the fluid a desired constituent, and thereafter separating the treated fluid from the resin.

JULIAN R. LITTLE.